Feb. 15, 1966      M. A. YANT      3,235,284
WEIGHT TRANSFER DEVICE FOR TRAILING VEHICLE
Filed July 19, 1963
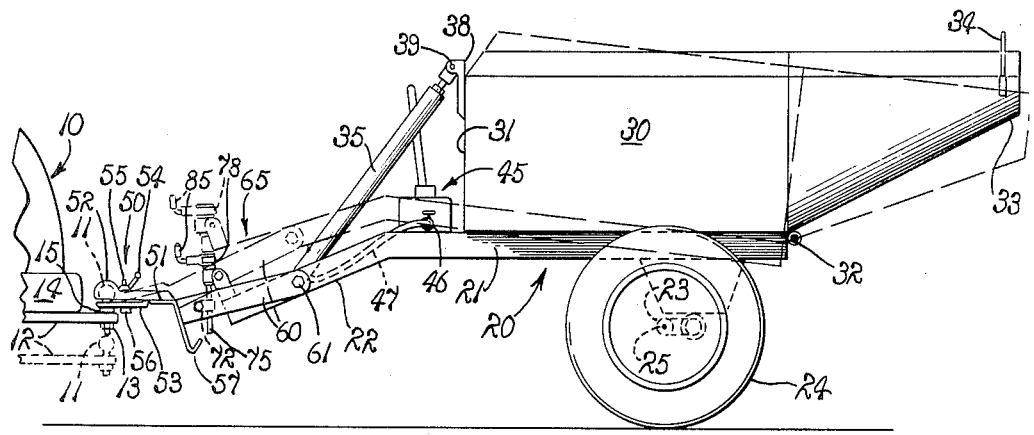
*FIG. 1.*
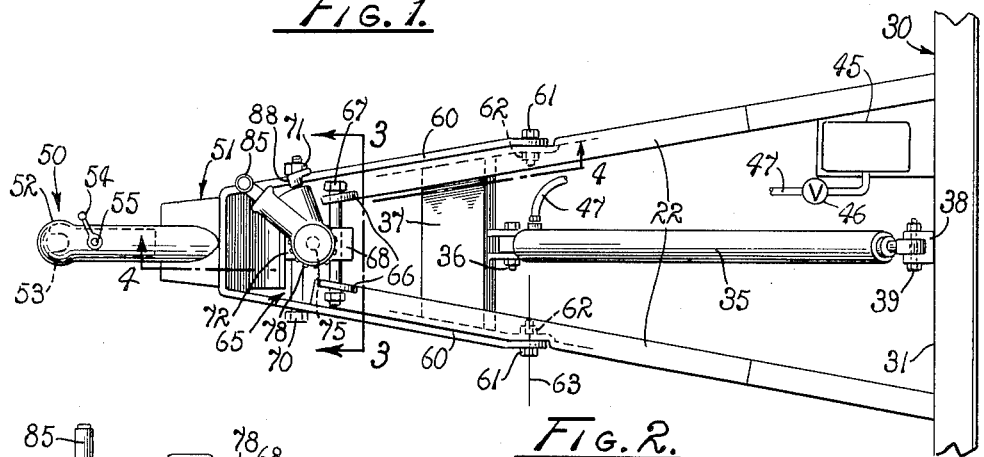
*FIG. 2.*
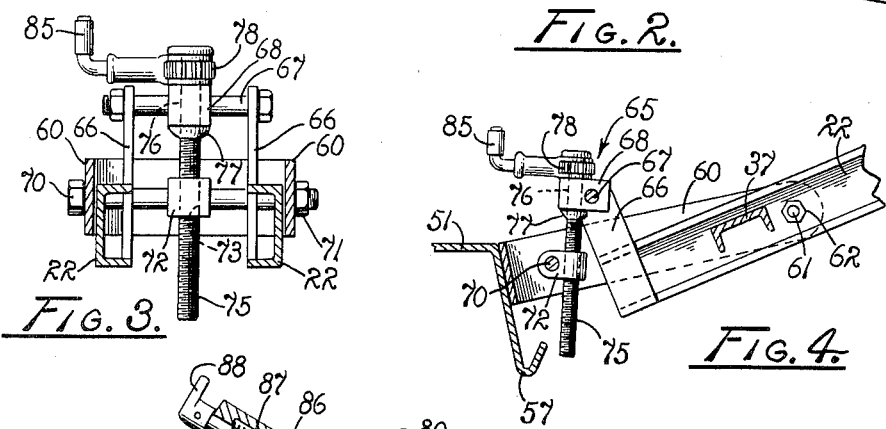
*FIG. 3.*      *FIG. 4.*
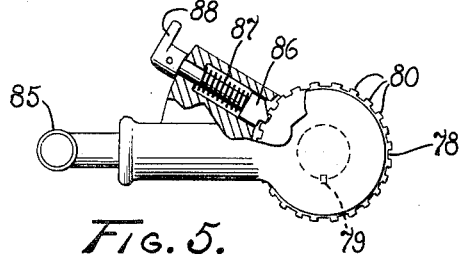
*FIG. 5.*
MILTON A. YANT
INVENTOR
Huebner & Worrel
ATTORNEYS United States Patent Office 3,235,284
Patented Feb. 15, 1966

3,235,284
WEIGHT TRANSFER DEVICE FOR
TRAILING VEHICLE
Milton A. Yant, 1508 Thesta, Fresno, Calif.
Filed July 19, 1963, Ser. No. 296,304
2 Claims. (Cl. 280—405)

This invention relates to a weight transfer device incorporated in the draft member of a trailing vehicle to permit selective shifting of the load on the trailing vehicle to a draft vehicle. The invention particularly adapts a trailing vehicle to be drawn by a variety of self-powered draft vehicles which have individual draft elements disposed at a variety of respective elevations.

It is a contemporrary practice to provide trailing vehicles on a rental basis for an agreed upon term for the convenience of prospective lessees. These vehicles are frequently in the form of two-wheeled trailers providing a box-like body of limited capacity and adapted to confine and support a load therein. Some of these vehicles are of the four-wheeled variety and certain of them are provided with other types of load supporting bodies, such as liquid confining tanks, platforms adapted to carry racing automobiles and the like, and house trailers. Conventionally, all such trailing vehicles are provided with some type of forwardly extending tongue, although the respective lengths may vary between different types.

It is also a practice of the lessor of such trailing vehicles to provide the self-powered vehicle with a draft element by which the trailing vehicle is drawn or motivated. Since the self-powered vehicles are usually in the form of conventional passenger automobiles, wide variations in the respective heights of the draft elements provided are encountered. This is particularly true when a comparison is made between the so-called standard-size automobiles and the smaller, domestically manufactured automobiles, known as compact, or economy models. The elevation of the draft elements varies to an even greater degree from that of the standard-size automobiles to the so-called economy automobiles of foreign manufacture.

When a rental trailer of any of the above types is secured in draft relationship to an automobile affording a draft element disposed at an elevation other than that for which the trailer was designed, the weight of the load supported by the trailer is shifted either forwardly or rearwardly of the transverse pitch axis afforded by the wheels of the trailer. This is particularly true in a two-wheeled trailer, or in a four-wheeled trailer wherein the axles are closely spaced. With such an uneven weight distribution, the trailing vehicle tends to be unstable during earth traversing movement. This instability increases with speed, and during highway travel, when speeds in the range of 45 to 60 miles per hour are encountered, this instability represents a definite hazard to traffic safety.

Accordingly, it is an object of the present invention to provide a weight transfer device suitable for use in the draft member of a trailing vehicle whereby the weight of the trailing vehicle may be selectively shifted to a power vehicle employed to motivate such trailing vehicle.

Another object of the invention is to provide a weight transfer device incorporated in the draft member of such a trailing member to accommodate draft elements of several types of motivating vehicles, each of such draft elements being disposed at a respective elevation.

Another object is to provide in a trailing vehicle having a load supporting body a means to adjust and maintain the body in a selected attitude regardless of the elevation of the draft element of a power vehicle to which the trailing vehicle is connected.

Another object is to decrease the hazard to traffic safety resulting from the use of contemporary trailer hitches which cannot accommodate a variety of automobile types and draft element elevations.

These, together with other objects, will become more fully apparent upon reference to the following description and accompanying drawings.

In the drawings:

FIG. 1 is a view in side elevation of a trailing vehicle provided with a weight transfer device embodying the principles of the present invention and incorporated in a hitch coupling mechanism, a powered draft vehicle being fragmentarily illustrated in towing relation to the trailing vehicle.

FIG. 2 is a fragmentary, enlarged, top plan view of the mechanism of FIG. 1.

FIG. 3 is an enlarged view in vertical, transverse section taken on line 3—3 of FIG. 2.

FIG. 4 is an enlarged fragmentary view in vertical, longitudinal section, taken on line 4—4 of FIG. 2.

FIG. 5 is an enlarged top plan view of a ratchet mechanism shown in FIG. 2, parts being broken away for illustrative convenience.

Referring more particularly to FIG. 1, an automobile is fragmentarily illustrated at 10 as a form of self-powered vehicle suitable for towing purposes. The automobile provides a draft element in the form of a ball stud 11 rigidly secured to a drawbar 12 by means of a retaining nut 13. The drawbar 12 is releasably, rigidly secured to a rear bumper 14 of the automobile 10 by means, not shown, and thereby disposes the ball stud at an elevation determined by the height of the bumper 14. It will be appreciated that the respective bumpers of various forms of automobiles dispose such ball studs 11 at various elevations, such as the lower elevation shown in dashed lines in FIG. 1 or the higher elevation shown in full lines. To facilitate support of a trailing vehicle, subsequently to be described, the ball stud 11 is provided with an upwardly presented annular shoulder 15.

A trailer 20 is shown in FIG. 1 which includes a rigid frame 21 having a forwardly projecting tongue 22. The frame is supported by a transverse axle 23 on which is mounted a pair of laterally opposed ground engaging wheels 24. The axle provides an axis 25 of rotation for the wheels which also constitutes a transverse pitch axis for the frame 21. Upon raising and lowering of the tongue 22, the trailer 20 is rocked about the pitch axis 25. As illustrated in dashed lines in FIG. 1, elevation of the tongue 22 causes a rearward pitching of the frame 21 about the axis 25.

The trailer 20 includes a box-like body 30 supported on the frame and provided with a circumscribing wall 31 adapted to confine a load. The form of the trailer illustrated is specifically adapted to transport flowable substances, such a pre-mixed concrete, sand, gravel, and the like. The body 30 is pivotally connected to the frame 21 by means of a hinged connection 32 which permits pivotal movement of the body about a transverse axis afforded by the hinge. The body is capable of movement from a transport position, shown in solid lines in FIG. 1, to a dumping position upon clockwise rotation, as viewed, about the transverse axis afforded by the hinge 32. A rearwardly directed discharge chute 33 is selectively closed by a removable gate 34 to facilitate controlled discharge of the contents from the body.

An hydraulically actuated ram 35 is pivotally connected at one end by a bolt 36 to transverse brace 37 secured to the forwardly projecting tongue 22. The opposite end of the ram 35 is pivotally connected by a bolt 38 to a bracket 39. The bracket is secured to the body 30 at a point sufficiently elevated relative to the transverse axis of the hinge 32 so that appropriate extension of the ram 35 provides a lever arm effective to cause rearward pitching movement about the axis of the hinge to move the body to a dumping position.

To effect selective movement of the body 30 between transport and dumping positions, a hand pump and reservoir for pressure fluid, schematically illustrated at 45, are supported on the frame 21. A control valve 46 selectively controls flow of pressure fluid between the ram 35 and the reservoir by means of an interconnecting flexible conduit 47. Accordingly, appropriate positioning of the control valve 46 and operation of the hand pump effects extension of the ram 35 and movement of the body 30 to a rearwardly tipped, dumping position. Conversely, appropriate positioning of the valve 46 permits return of the pressure fluid from the ram 35 to the reservoir and gravitational return of the body to a transport position, as shown in FIG. 1.

To facilitate releasable connection of the trailer 20 with the ball stud 11 of the automobile 10, a trailer hitch coupling 50 is provided. The coupling includes a longitudinally rigid hitch link 51 having a forwardly disposed retaining member 52 providing a downwardly presented socket adapted to receive therein the ball stud 11. A lower yoke member 53 is adapted slidably to receive the ball stud 11 and rest upon the shoulder 15. A locking lever 54 is screw-threadably secured to a retaining bolt 55 received in suitable aligned apertures respectively provided in the hitch link 51 and the lower yoke member 53. An enlarged head 56 integral with the bolt bears against the yoke member 53 thereby releasably capturing the ball stud within the socket of the upper retainer 52. When secured in such a manner, relative universal movement is permitted between the automobile 10 and the trailer 20 while adapting the hitch coupling 50 to transmit a pulling force on the trailer. As is a conventional practice, suitable safety chains, not shown, may be connected between the automobile and trailer to serve as a safety expedient in the event of an inadvertent failure of the hitch coupling. A ground skid 57 downwardly extends from the rigid link 51 to serve as the support for the trailer tongue 22 when disconnected from the ball stud 11.

The rearward portion of the link 51 is provided with laterally opposed rearwardly extended draft arms 60, each of which is pivotally connected to the tongue 22 by respective pivot bolts 61 secured by nuts 62. The bolts 61 are substantially transversely aligned to provide a common transverse axis 63, which serves as a first axis in the weight transfer device, generally indicated at 65, which accommodates the hitch coupling 50.

The weight transfer and accommodating device 65 includes a pair of upstanding lugs 66 rigidly secured to the forward end of the tongue 22. An upper pivot pin is rotatably received in substantially aligned apertures provided in each of the lugs 66 and affords a second axis for the weight transfer device 65. The upper pin 67 is rotatably received within a transverse bore provided in an upper pivot block 68.

A lower pivot pin 70 is extended through transversely aligned bores provided in each of the draft arms 60 and retained on the arms by a nut 71. A lower pivot block 72 is pivotally mounted on the pin 70 for rocking movement about a transverse axis and is also provided with a threaded bore 73 lying in a substantially vertical plane.

An extensible link in the form of a threaded screw 75 is screw-threadably received in the bore 73 and thereby is adapted for axial advancement in either direction of the bore upon appropriate rotation of the screw. The screw 75 is provided with a cylindrical shank 76 immediately adjacent to an annular shoulder 77. The shank 76 is rotatably received and journaled in a smooth bore provided in the upper pivot block 68. A ratchet head 78 is secured to the screw 75 as by a key 79 and is provided with plurality of circumferentially spaced ratchet teeth 80.

A ratchet drive mechanism includes an operating crank handle 85 in which is supported a pawl 86 urged by a spring 87 into contact with the ratchet wheel 78 and in driving engagement with one of the teeth 80. A reversing lever 88 accommodates manual rotation of the screw 75 in either direction upon appropriate rotation of the handle 85, and permits effective operation even when movement of the handle is limited or restricted to an arc of travel less than 360°.

*Operation*

The operation of the described embodiment of the subject invention is believed to be readily apparent and is briefly summarized at this point. Assuming that the trailer 20 is to be secured to the automobile 10 by means of the ball stud 11 and the hitch coupling 50, the upper retainer 52 is disposed in overlying relationship to the ball stud, the lower yoke member 53 positioned on the shoulder 15 and the releasable connection provided by the retaining bolt 55 and the locking lever 54 completed. Accordingly, the trailer is releasably connected to the automobile for universal movement relative thereto and to receive motivating draft force therefrom.

As shown in solid lines in FIG. 1, the weight transfer and hitch accommodating device 65 has been adjusted to dispose the body 30 in a substantially horizontal load transporting position. Assuming that the weight transfer device 65 had been previously adjusted to assume the position shown in dashed lines, the body 30 would also be disposed in a substantially horizontal position provided that the ball stud 11 were disposed at a lower elevation such as is shown in dashed lines in FIG. 1. To compensate for the difference in elevation of the ball stud, as shown in dashed lines to that shown in full lines and mounted on the automobile 10, the ratchet reversing lever 88 is positioned to permit decreasing the effective length of the screw 75 by rotation thereof. Therefore, appropriate rotation of the handle 85 moves the upper pivot block 68 toward the lower pivot block 72, as the screw 75 is threaded therethrough. Consequently, the tongue 22 is moved from an upper position, shown in dashed lines in FIG. 1, to a lower position, shown in full lines. This shortening of the effective length of the screw 75 and lowering of the tongue 22 results in counterclockwise movement of the frame 21, as well as the trailer body 30, about the axis 25. Accordingly, material previously disposed rearwardly of the axis 25 is moved forwardly thereof and effects a transfer of a portion of the weight of the trailer as well as the substance confined within the body. This portion of the weight is transferred to the automobile 10 through the hitch coupling device 50 and the ball stud 11.

In the event that the trailer were subsequently to be drawn by an automobile providing a bumper at a lower elevation, such as that illustrated by the ball stud 11 in dashed lines, the trailer tongue 22 would be moved to a position lower than that shown in full lines in FIG. 1. Consequently, still another portion of the weight of the trailer, as well as the substance confined in the body, would be shifted forwardly of the axis 25. In the case of many automobiles providing a ball stud at such a lower elevation, their physical size and load bearing capacity are such that they cannot support any additional weight which would be imposed on them with the trailer pitched forwardly to such a degree.

To accommodate such low elevations of the ball stud 11, the weight transfer and trailer hitch accommodating device 65 is operated to increase the effective length of the screw 75 and thereby elevate the tongue 22. Such elevation results in clockwise rearward rocking of the trailer frame 21 and body 30 about the axis 25. Consequently, a portion of the weight of the trailer, as well as the contents thereof, is transferred rearwardly of the axis 25 until a satisfactory degree of weight distribution is achieved. If additional weight is to be shifted to the trailer wheels 22 and removed from the automobile 10, further operation of the handle 85 in a direction to cause further extension of the screw 75 is performed. This will further elevate the tongue 22 to a position approximating that shown in dashed lines in FIG. 1 so that a corresponding transfer of the trailer and contents weight can be made to a position rearwardly of the axis 25.

Accordingly, it can be seen that the present invention provides in a trailing vehicle a device which can selectively transfer the weight between the vehicle used to pull the trailer and the ground engaging wheels of the trailer. The weight transfer function of the device is effectively employed with automobiles affording a draft element, such as the ball stud 11 at a uniform elevation, and equally so employed to accommodate a great variety of elevations of such draft elements. By use of the present invention, standard trailers can be hitched to a variety of automobiles, each affording a draft element at a respective elevation. By appropriate adjustment of the weight transfer and accommodating device 65, the trailer body can be disposed at an optimum position. Consequently, appropriate transfer of weight can be made between the two vehicles so that optimum stability and safety during high speed travel is achieved.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a trailing vehicle adapted to be drawn by an automobile affording a draft element disposed at a predetermined elevation, a rigid frame including a forwardly projecting tongue; means including a transverse axle and laterally opposed wheels rotatably mounted thereon adapting the frame for earth traversing movement; a body member having wall means adapted to confine a substance therewithin; means mounting the body on the frame; trailer hitch coupling means adapted for releasable connection with said draft element, including a longitudinally rigid hitch link affording laterally opposed rearwardly extended draft arms; means pivotally connecting the arms with said tongue in transversely overlapping relation for relative movement about a first axis with the tongue being positionable through a range of movements having opposite limits of travel respectively spaced above and below the draft arms; pivot means carried by said tongue and affording a second pivotal axis forwardly spaced from said first axis; pivot means carried by said draft arms affording a third axis forwardly spaced from said first axis and from said tongue and elevationally spaced from said second axis; an extensible link interconnecting the respective pivot means providing said second and third axes; and means to effect controlled extension and retraction of said extensible link with said pivot means of said tongue and said arms abutting each other at one limit of travel of said tongue and spaced from each other at the other limit of travel so that both forward and rearward rocking movement of said frame and said body is selectively permitted about said axle.

2. In a trailing vehicle adapted to be drawn by an automobile affording a draft element disposed at a predetermined elevation, a rigid frame including a forwardly projecting tongue; means including a transverse axle and laterally opposed wheels rotatably mounted thereon adapting the frame for earth traversing movement; a body member having wall means adapted to confine a substance therewithin; means mounting the body on the frame; trailer hitch coupling means adapted for releasable connection with said draft element, including a longitudinally rigid hitch link affording laterally opposed rearwardly extended draft arms; means pivotally connecting the draft arms with the tongue for movement about a common transverse axis; said tongue affording a forwardly projecting portion extending forwardly of said common transverse axis in transversely overlapping relation with the draft arms, said forward end of the tongue being positionable through a range of movements respectively spaced above and below said draft arms; a pair of upstanding lugs rigidly secured to said forward end; an upper pivot pin rotatably carried in said upstanding lugs and affording a second transverse axis; an upper pivot block carried on said upper pivot pin; a lower pivot pin rotatably carried in said draft arms forwardly of said common transverse axis and providing a third transverse axis; a lower pivot block carried on said lower pivot pin and affording a threaded bore disposed substantially at right angles to said third transverse axis; an elongated screw received in said pivot block and adapted for axial advancement and retraction through said threaded bore; means connecting said screw with said upper pivot block disposing the screw in a substantially upright position therebetween permitting rotation of the screw therein; and ratchet means including an operating handle operatively connected to said screw to effect selective rotation thereof to cause movement of said second transverse axis toward and away from said third axis with said upper pivot block abutting said lower pivot block when said forward end of the tongue is extended below the draft arms and spaced from each other when said tongue is disposed above said arms to cause both forward and rearward rocking of the frame about said axle with said pivot blocks maintaining said screw substantially in said upright position.

References Cited by the Examiner

UNITED STATES PATENTS

| | | | |
|---|---|---|---|
| 1,775,297 | 9/1930 | Towner | 280—490 |
| 2,328,343 | 8/1943 | Jacob | 280—490 |
| 2,546,531 | 3/1951 | Vutz | 280—490 X |
| 2,718,431 | 9/1955 | Pietroria | 298—22 |
| 2,892,659 | 6/1959 | Francois | 298—22 |
| 3,035,856 | 5/1962 | Mleczko | 280—490 |

FOREIGN PATENTS 114,964   3/1942   Australia.

BENJAMIN HERSH, *Primary Examiner.*

LEO FRIAGLIA, *Examiner.*